US012110183B2

(12) United States Patent
Fosnight et al.

(10) Patent No.: US 12,110,183 B2
(45) Date of Patent: Oct. 8, 2024

(54) ROBOTIC EACH PICKING IN A MICRO-FULFILLMENT CENTER

(71) Applicant: Walmart Apollo, LLC, Bentonville, AR (US)

(72) Inventors: William J. Fosnight, Windham, NH (US); John G. Lert, Jr., Wakefield, MA (US); Christopher Hofmeister, Hampstead, NH (US)

(73) Assignee: Walmart Apollo, LLC, Bentonville, AR (US)

( * ) Notice: Subject to any disclaimer, the term of this patent is extended or adjusted under 35 U.S.C. 154(b) by 563 days.

(21) Appl. No.: 17/338,814

(22) Filed: Jun. 4, 2021

(65) Prior Publication Data

US 2021/0380343 A1 Dec. 9, 2021

Related U.S. Application Data

(60) Provisional application No. 63/034,959, filed on Jun. 4, 2020.

(51) Int. Cl.
*B65G 1/137* (2006.01)
*B25J 9/16* (2006.01)
*B65G 1/04* (2006.01)
*B65G 47/90* (2006.01)

(52) U.S. Cl.
CPC .......... *B65G 1/1378* (2013.01); *B25J 9/1697* (2013.01); *B65G 1/0485* (2013.01); *B65G 1/1375* (2013.01); *B65G 47/905* (2013.01); *B65G 2201/0258* (2013.01); *B65G 2203/041* (2013.01); *B65G 2209/06* (2013.01); *B65G 2811/0663* (2013.01)

(58) Field of Classification Search
CPC .. B65G 1/1378; B65G 1/0485; B65G 1/1375; B65G 47/905; B65G 2201/0258; B65G 2203/041; B65G 2209/06; B25J 9/1697
See application file for complete search history.

(56) References Cited

U.S. PATENT DOCUMENTS

| 2014/0180479 | A1 | 6/2014 | Argue et al. | |
|---|---|---|---|---|
| 2014/0244026 | A1* | 8/2014 | Neiser | B65G 1/1378 700/216 |
| 2015/0086304 | A1* | 3/2015 | Hasman | B65G 1/1378 414/269 |

(Continued)

FOREIGN PATENT DOCUMENTS

| EP | 3807184 | 4/2021 |
|---|---|---|
| EP | 3877300 | 9/2021 |

(Continued)

*Primary Examiner* — Kyle O Logan
(74) *Attorney, Agent, or Firm* — Fitch, Even, Tabin & Flannery, LLP

(57) ABSTRACT

A workstation receives bots carrying order totes and bots carrying product totes for transfer of goods from the product totes to the order totes. The workstation comprises a robot for automated transfer of goods between the product and order totes, but may also have a station for an operator to perform manual transfer. Cameras may be provided to capture images of the product and/or order totes to identify contents of totes and to identify positions where goods are to be picked from the product totes and placed into the order totes.

20 Claims, 4 Drawing Sheets

(56) References Cited

U.S. PATENT DOCUMENTS

| | | | |
|---|---|---|---|
| 2016/0031644 A1* | 2/2016 | Schubilske | B65G 1/1378 700/216 |
| 2016/0130085 A1* | 5/2016 | Yamashita | B65G 1/1378 414/807 |
| 2016/0355337 A1 | 12/2016 | Lert | |
| 2016/0355340 A1* | 12/2016 | Meurer | B65G 1/1378 |
| 2017/0021499 A1 | 1/2017 | Wellman et al. | |
| 2017/0313514 A1* | 11/2017 | Lert, Jr. | B65G 1/0492 |
| 2017/0369244 A1 | 12/2017 | Battles et al. | |
| 2018/0134492 A1 | 5/2018 | Lert, Jr. | |
| 2018/0141211 A1 | 5/2018 | Wellman et al. | |
| 2018/0150793 A1* | 5/2018 | Lert, Jr. | G06Q 10/0833 |
| 2018/0194556 A1* | 7/2018 | Lert, Jr. | G06Q 10/087 |
| 2018/0247257 A1 | 8/2018 | Lert, Jr. | |
| 2018/0305123 A1* | 10/2018 | Lert, Jr. | G06Q 10/087 |
| 2018/0341908 A1 | 11/2018 | Lert, Jr. | |
| 2019/0039829 A1 | 2/2019 | High et al. | |
| 2019/0270591 A1* | 9/2019 | Lert, Jr. | B65G 1/0435 |
| 2020/0016770 A1 | 1/2020 | Kamranzadeh et al. | |
| 2020/0189122 A1 | 6/2020 | Polido et al. | |
| 2020/0316786 A1* | 10/2020 | Galluzzo | B25J 9/162 |
| 2020/0317450 A1* | 10/2020 | Parrott | B65G 1/1373 |
| 2020/0346351 A1 | 11/2020 | Edwards et al. | |
| 2020/0407165 A1 | 12/2020 | Roth et al. | |
| 2021/0097709 A1 | 4/2021 | Edwards et al. | |
| 2021/0129354 A1 | 5/2021 | Wilson, II et al. | |
| 2021/0362953 A1* | 11/2021 | Schedlbauer | G06Q 10/087 |
| 2023/0183008 A1* | 6/2023 | Yamashita | B65G 1/1378 700/218 |

FOREIGN PATENT DOCUMENTS

| | | |
|---|---|---|
| WO | 2018146687 | 8/2018 |
| WO | 2020249244 | 12/2020 |

* cited by examiner

ROBOTIC EACH PICKING IN A MICRO-FULFILLMENT CENTER

PRIORITY DATA

The present application claims priority to U.S. Provisional Patent Application No. 63/034,959, filed on Jun. 4, 2020, entitled "ROBOTIC EACH PICKING IN A MICRO-FULFILLMENT CENTER", which application is incorporated by reference herein in its entirety.

BACKGROUND

An order-fulfillment system for use in supply chains, for example in retail supply chains, may fulfill orders for individual product units, referred to herein as "eaches" or goods. Conventional operations to fulfill orders for eaches are generally labor-intensive because they generally apply picker-to-goods processes that are not highly automated. It is known to provide automated goods-to-picker systems where goods are brought to a workstation for fulfilling orders. Automated goods-to-picker systems typically require the use of human operators (aka Pickers) at the workstations to transfer eaches from product totes to customer order totes.

FIGURES

DESCRIPTION

Figure 1:
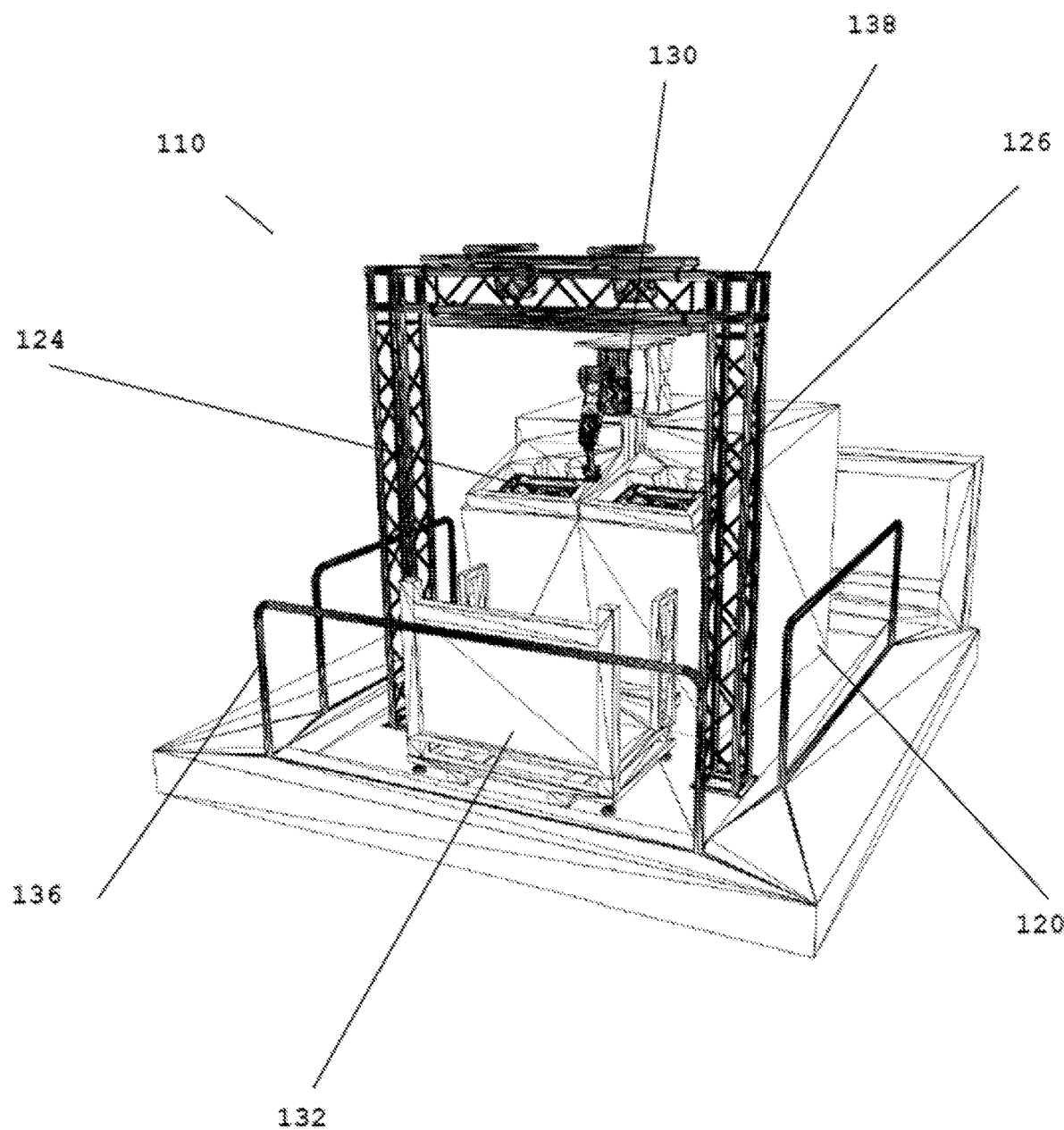
FIG. 1 is an isometric view of a picking workstation according to embodiments of the present technology.

Embodiments of the present technology will now be described with reference to the figures, which in general relate to a micro-fulfillment center and more specifically to workstations for automated fulfillment of orders.

It is understood that the present embodiments may be embodied in many different forms and should not be construed as being limited to the embodiments set forth herein. Rather, these embodiments are provided so that this disclosure will be thorough and complete and will fully convey the invention to those skilled in the art. Indeed, the embodiments are intended to cover alternatives, modifications and equivalents of these embodiments, which are included within the scope and spirit of the invention as defined by the appended claims. Furthermore, in the following detailed description, specific details are set forth in order to provide an understanding of the present embodiments.

The terms "top" and "bottom," "upper" and "lower" and "vertical" and "horizontal" as may be used herein are by way of example and illustrative purposes only and are not meant to limit the description of the embodiments inasmuch as the referenced item can be exchanged in position and orientation. Also, as used herein, the terms "substantially" and/or "about" mean that the specified dimension or parameter may be varied within an acceptable manufacturing tolerance for a given application. In one non-limiting embodiment, the acceptable manufacturing tolerance is ±2.5%.

The picking workstations, operating systems and methods disclosed may be used in conjunction with robotic picking system(s) and robotics, for example, as disclosed in U.S. Patent Publication Number US2016/0355337 A1 having publication date Dec. 8, 2016 and entitled "Storage and Retrieval System" and in U.S. Patent Publication Number US2017/0313514 A1 having publication date Nov. 2, 2017 and entitled "Order Fulfillment System" both of which are incorporated by reference herein in their entirety. Similarly, the picking workstations, operating systems and methods disclosed may be used in conjunction with a robotic picking system(s) and robotics that are deployed in conjunction with retail store formats, for example, as disclosed in U.S. Patent Publication Number US2018/0134492 A1 having publication date May 17, 2018 and entitled "Automated-Service Retail System and Method" which is incorporated by reference herein in its entirety. Further, the store formats, operating systems and methods disclosed herein may be used in conjunction with different elements of full or partially automated supply chain systems, for example, as disclosed in the following: U.S. Patent Publication Number US2018/0150793 A1 having publication date May 31, 2018 and entitled "Automated Retail Supply Chain and Inventory Management System"; U.S. Patent Publication Number US2018/0194556 A1 having publication date Jul. 12, 2018 and entitled "Interchangeable Automated Mobile Robots with a Plurality of Operating Modes Configuring a Plurality of Different Robot Task capabilities"; U.S. Patent Publication Number US2018/0247257 A1 having publication date Aug. 30, 2018 and entitled "Inventory Management System and Method", U.S. Patent Publication Number US2018/0341908 A1 having publication date Nov. 29, 2018 and entitled "Fully Automated Self Service Store", U.S. Patent Publication Number US2018/0150793 A1 having publication date May 31, 2018 and entitled "Automated Retail Supply Chain and Inventory Management System" and U.S. Patent Publication Number US2018/0305123 A1 having publication date Oct. 25, 2018 and entitled "Picking Workstation with Mobile Robots and Machine Vision Verification of Each Transfers Performed by Human Operators", all of which are incorporated by reference herein in their entirety.

The picking workstations, operating systems and methods disclosed may be utilized in the foregoing examples and further by way of non-limiting example in applications such as summarized in FIG. 1, where FIG. 1 is an isometric view of a picking workstation illustrating an example workstation 110 in a micro fulfillment center in which some example embodiments of this disclosure may be implemented. Workstation 110 may be utilized in a "goods to picker" (G2P) system that may have a material control system (MCS), container or tote storage area, container transport that move containers or totes from one location to another within the system, each picking module, a decant module, a container induction module and a dispense module. In one example, the G2P system may be an order-fulfillment system for automated fulfillment of orders, for example received via an e-commerce model. The embodiments of the G2P system may for example include a multi-level rack structure that holds picking stock. The G2P system further includes workstations 110 at which human or robotic pickers receive cases or containers of eaches for transport of the eaches into order containers. Although workstation 110 may be described as supporting both human and robotic picking, alternately the workstation and features disclosed may be utilized on robotic only or human only workstations. Mobile vehicles or robots are provided, which are autonomous vehicles that perform various transfer and transport functions in the G2P system, including handling the movement of containers of goods between storage locations within the rack structure and the workstations. The G2P system may further include a centralized control system (or distributed), comprising computers, memory, software, and communications components, which manages the operation of the entire system. The G2P system may also include one or more input/output interfaces where cases or individual goods are inducted into the system to replenish the picking stock and completed orders are discharged from the system to be delivered eventually to customers. Containers used to transport goods in the G2P may be referred to herein as totes. Such totes may include sub-totes, which are smaller totes, dividers or compartments within the totes for separating goods of different SKUs within a tote. It is understood that the G2P system may include a variety of other components, in addition to or instead of those described above.

The G2P system and associated components of the G2P system may maintain a database storing product information for each of the products in the whole inventory of the system. The product information may include a product name, a product code, a location code (e.g., zone, aisle, shelf, bin, etc.), a frozen status or chilled status, a quantity of the product displayed on a sales floor, a category, a department, a priority to be dispensed, a quantity of the product to be dispensed, a time to be dispensed, a scheduled pickup time, stock status, and a product supplier. The product code of each of the products can be a Universal Product Code (UPC) code, a Quick Response (QR) code or other standard codes associated with the product information saved in the database. Data associated with the products received can be scanned and read where once the product is scanned as received by the G2P system in the database, various information regarding the product may be retrieved from the database. For example, a location code of a product may be where the product is stored in the G2P system 160 etc. The stock status of a product may be indicated as "out of stock", "low stock", or "regular stock". The product information may further include product specifications, such as dimensions, weight, shape, color, storage temperature, expiration date etc. The database may store other product information, such as scheduled pickup times, pending customer orders, historical sales data, current and seasonal velocity or other attributes associated with each product sold in or fulfilled from the retail self-service store 116.

The picking sequences disclosed may be utilized, for example, in an "e-commerce model". In the "e-commerce" model, customers select goods from a software application that may be computer, cellular or other device based which allows the customer to select goods in the order from the application to be fulfilled from within the G2P system. Goods that make up orders in an "e-commerce" model may be picked from the G2P system and delivered to the customer where the customer picks up or takes delivery of the order to fulfill the e-commerce order after it has been compiled. The "e-commerce model" is an exemplary use of the G2P system in workstation 110 and alternately workstation 110 may be utilized in any suitable application of G2P system.

Referring now to FIG. 1, there is shown an isometric view of a picking workstation 110 according to embodiments of the present technology. Workstation 110 has frame 120 having order tote access side 124 and product tote access side 126. Although order tote side is shown on the left and product tote side is shown on the right, either side may be used. Robot 130 is positioned above both the tote access ports 124, 126 where robot 130 may be positioned as a six axis industrial robotic arm, for example, ABB IRB1200 or any suitable robot to enable picking from the Dynamic Workstation (DWS) product totes 126 and placing into order totes 124. Robot 130 may have a robotic arm, end effector, measurement and vision systems and associated software, for example, for object recognition or otherwise. The embodiment shown also has human picking platform 132 which allows a human to pick instead of robot 130 where the robot arm to positioned to be able to move/be moved to a position that safely allows manual picking from the DWS within that same picking workstation as a "hybrid workstation" configurable for human use or robotic use. By way of non-limiting example, because humans may be able to pick faster with a different or wider range of eaches, humans can pick during peak periods and then during non-peak periods the robotics can be used for pick and place operations and then the workstation can be reconfigured safely for humans to again pick during peak periods. Alternately, the system may be completely robotic. Robotic arm mounting frame (weldment) 138 may further be provided with structural integrity to support robot 130 and enable performant picking from and placement in totes, and also enables required maintenance access to the DWS 120. Safety fencing 136, interlocking mechanisms and safety systems may further be provided as needed.

Figure 2:
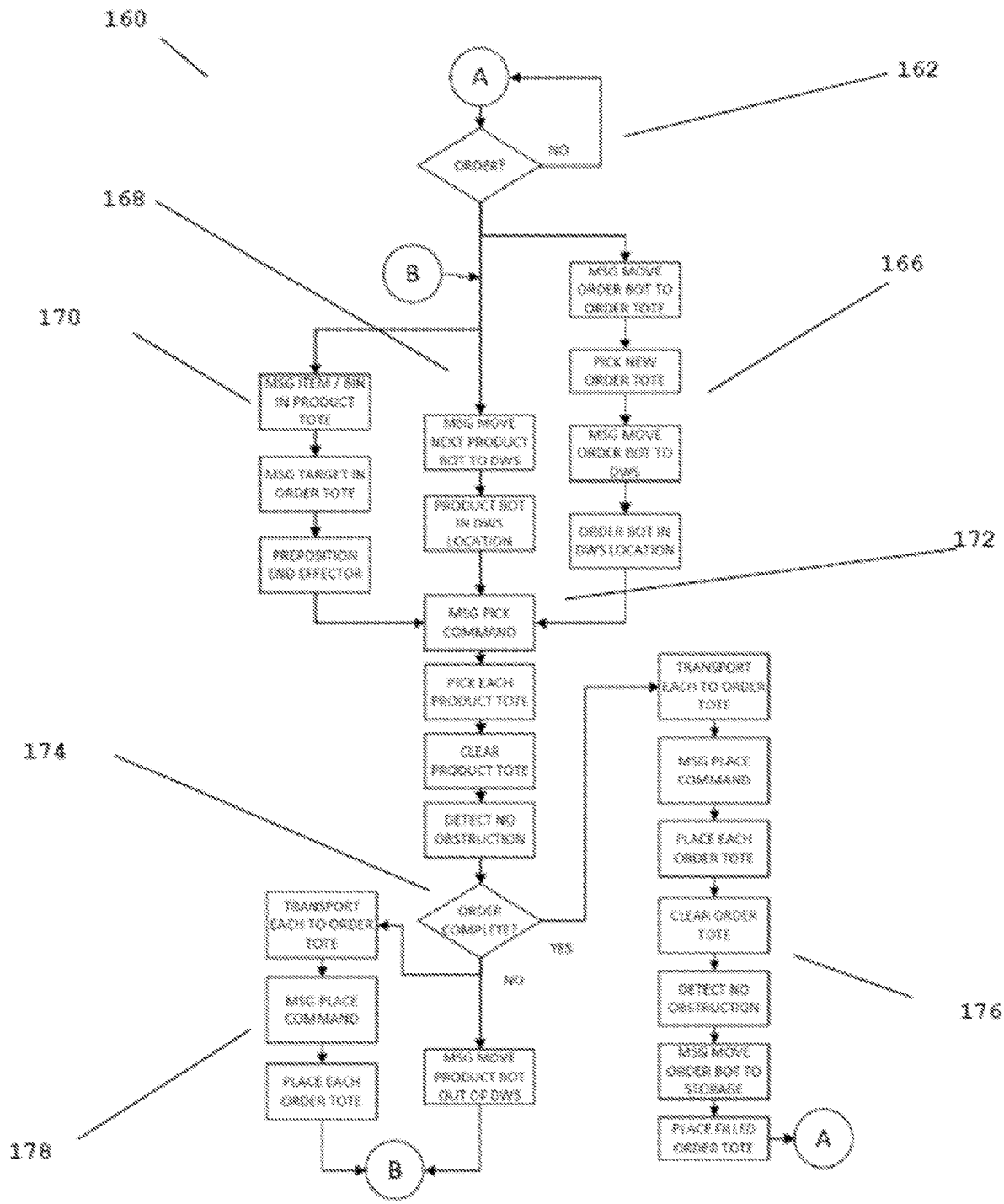
FIG. 2 is a flowchart showing an example each picking sequence diagram according to embodiments of the present technology.

Referring now to FIG. 2, there is shown an example each picking sequence diagram 160 according to embodiments of the present technology. The picking sequence starts where there is an order 162. Upon (or prior to) receipt of an order, an order bot sequence 166 dispatches an order bot to pick up an order tote, the tote is picked by the bot and transported to the DWS and positioned in the picking location 124. A product bot sequence 168 dispatches a product bot to pick up a product tote, the tote is picked by the bot and transported to the DWS and positioned in the picking location 126. Robot 130 is messaged 170 with item information for the item to be picked from the product tote and placed in the order tote, the target location in the order tote and prepositions the end effector over the product tote either prior to the product tote's arrival or otherwise. When the product and order totes are in position, a pick 172 is initiated where robot 130 is commanded to pick the each from the product tote and clear the product tote with no obstruction detected. If the order is completed 174 then sequence 176 is performed where robot 130 transports the picked each to the order tote, places the each in the order tote and clears the order tote with no obstruction where the bot can then move the order tote to storage where the order tote waits until the underlying order needs to be fulfilled and the sequence reverts back to 162 until another order needs to be filled. If the order is not completed in 174, then sequence 178 is performed where the product Bot exits the DWS and robot 130 transports the picked each to the order tote, places the each in the order tote and clears the order tote with no obstruction where the sequence then reverts back to 168, 170 until the order is fulfilled at 174. In practice, events identified can happen in parallel. By way of nonlimiting example, moving the next product Bot 168 into the DWS may happen while the previous product Bot is leaving the DWS such that robot 130 is operating continuously. Similarly, by way of nonlimiting example, robot 130 can be placing to the order bot while the product bots are exchanging such that robot 130 is operating continuously.

Figure 3:
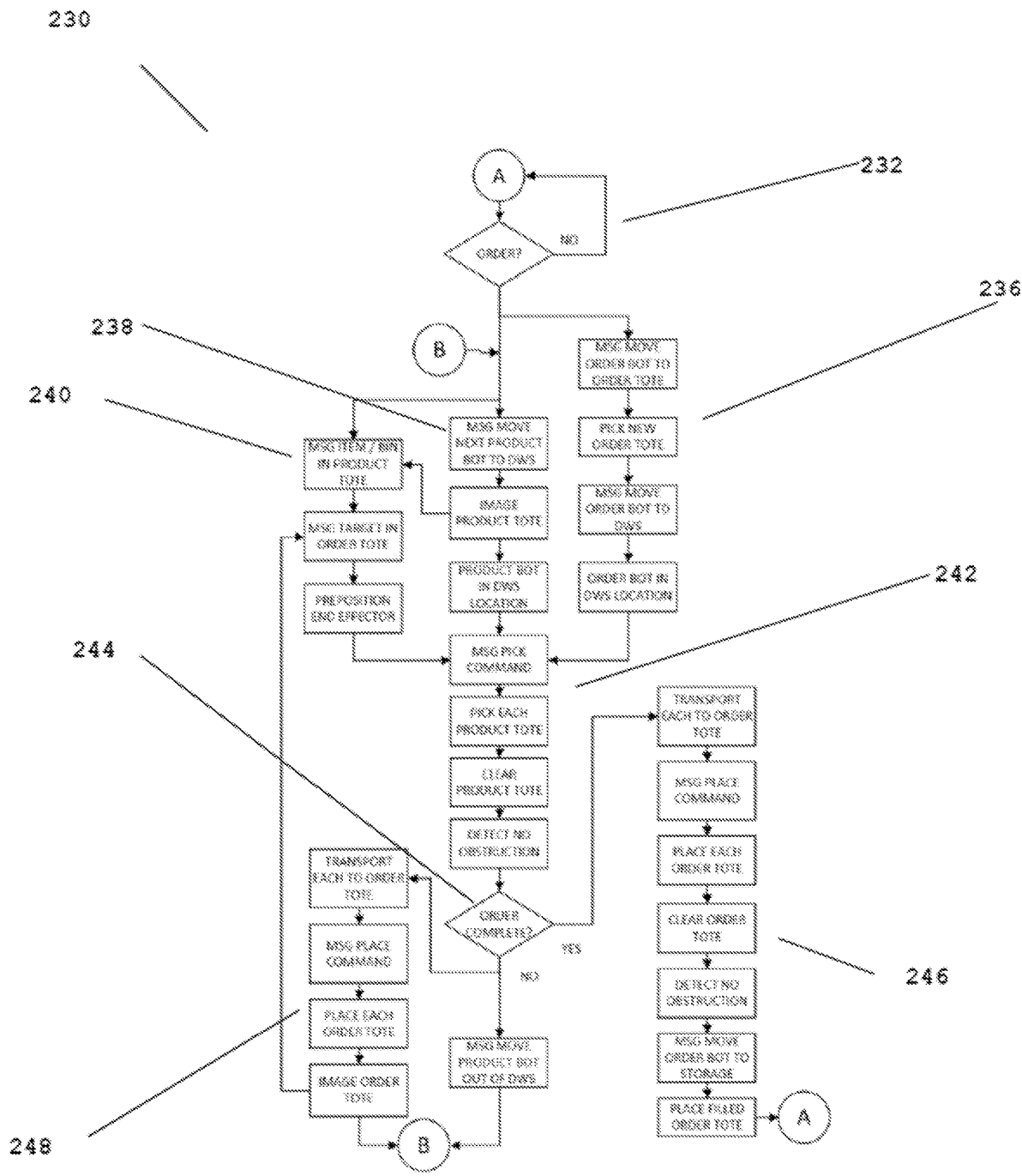
FIG. 3 is a flowchart showing an example each picking sequence diagram according to embodiments of the present technology.

Referring now to FIG. 3, there is shown an example each picking sequence diagram 230 according to embodiments of the present technology. The sequence described is similar to that described with respect FIG. 2 with the addition of utilizing images to preposition and preprocess images of the totes and eaches contained within the totes to more efficiently pick and place eaches. The picking sequence starts where there is an order 232. Upon (or prior to) receipt of an order, an order bot sequence 236 dispatches and order bot to pick up an order tote, the tote is picked by the bot and transported to the DWS and positioned in the picking location 124. An image of the tote may be taken prior to or during this transport sequence, for example, to verify the configuration and contents of the tote and/or sub-totes. A product bot sequence 238 dispatches a product bot to pick up a product tote, the tote is picked by the bot and transported to the DWS and positioned in the picking location 126 where an image of the tote and the tote's contents are taken and forwarded to robot 130 for processing. Robot 130 is messaged 240 with item information including location images for the item to be picked from the product tote and placed in the order tote, the target location in the order tote and prepositions the end effector over the product tote either prior to the product tote's arrival or otherwise. When the product and order totes are in position, a pick 242 is initiated where robot 130 is commanded to pick the each from the product tote and clear the product tote with no obstruction detected. If the order is completed 244 then a sequence 246 is performed where the robot 130 transports the picked each to the order tote, places the each in the order tote and clears the order tote with no obstruction where the bot can then move the order tote to storage where the order tote waits until the underlying order needs to be fulfilled and the sequence reverts back to 162 until another order needs to be filled. If the order is not completed 244 then a sequence 248 is performed where the product bot exits the DWS and robot 130 transports the picked each to the order tote, places the each in the order tote and clears the order tote with no obstruction where an image is taken to feed back to robot 130 for the next place and the sequence then reverts back to 238, 240 until the order is fulfilled at 244. In practice, events identified can happen in parallel. By way of nonlimiting example, moving the next product Bot 238 into the DWS may happen while the previous product Bot is leaving the DWS such that robot 130 is operating continuously. Further, in the sequence here, product tote images are fed to robot 130 prior to the pick and while the product tote is in transport such that robot 130 may process these images to preposition robot 130 to the each as opposed to just the tote improving cycle time of the pick. Further, in the sequence here, order tote images are fed to robot 130 prior to the place and while the pick is in process such that robot 130 may process these images to position robot 130 to a place location for the next each to be placed as opposed to collecting the image during the place sequence.

Figure 4:
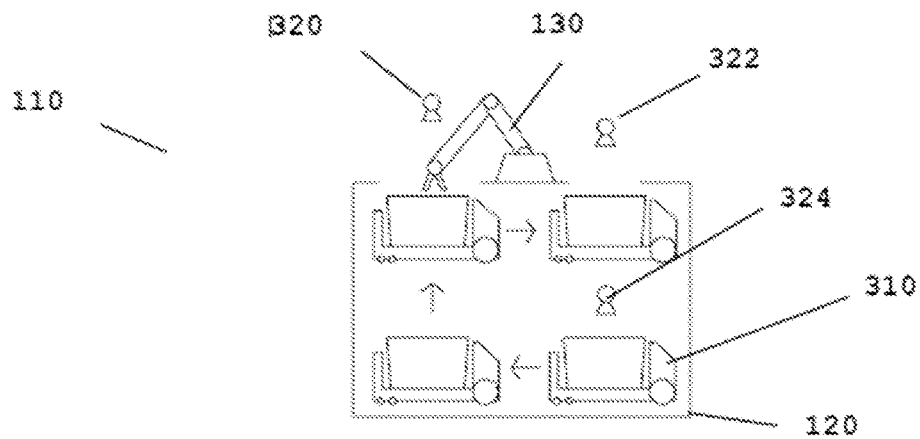
FIG. 4 is a schematic side view of a picking workstation according to embodiments of the present technology.

Referring now to FIG. 4, there is shown a schematic side view of a picking workstation 110 according to embodiments of the present technology. Workstation 110 has housing or frame 120 which allows Bots 310 to cycle into the workstation at the bottom right and cycle up to the pick or place location where Bot 130 can pick or place to the tote on Bot 310. One or more cameras 320, 322, 324 may be positioned with respect to the Bots and/or totes within Bots 310. For example, camera 320 may be positioned above a tote in the pick or place location on frame 138 to capture images, for example, before and/or after a pick or place. Camera 322 may be positioned to capture images of a tote after an order is fulfilled or after a product has been removed. Camera 324 may be positioned to capture images of a tote before an order is fulfilled or before a product has been removed. Alternately, cameras may be positioned within the G2P system or on Bot 310 to capture images of the payload otherwise in order to feed robot 130 in order to preprocess the images to determine optimum positioning of the end effector for picking and placing of eaches such that picks and places can happen seamlessly and without delay due to image processing.

Figure 5:
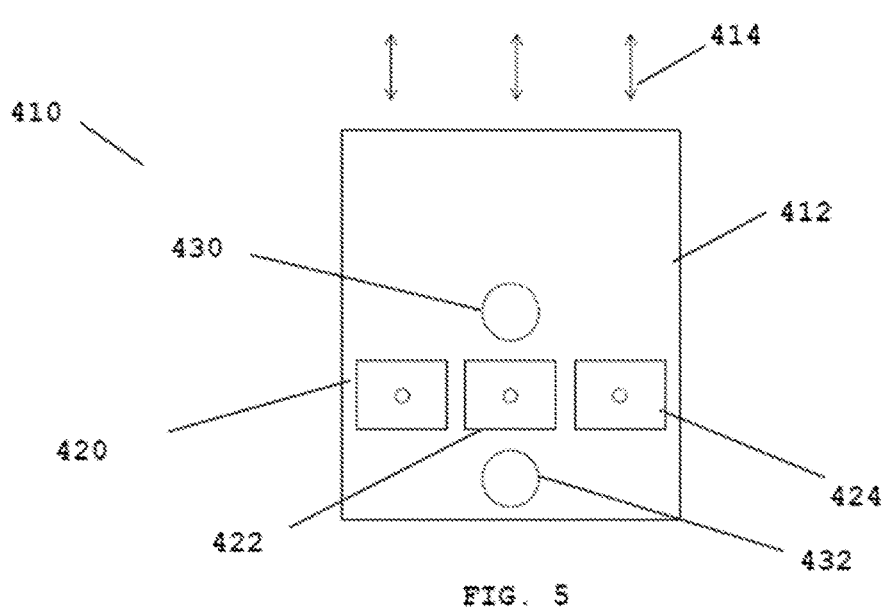
FIG. 5 is a schematic top view of a picking workstation according to embodiments of the present technology.

Referring now to FIG. 5, there is shown a schematic top view of a picking workstation 410 according to embodiments of the present technology. Workstation 410 may have workstation housing 412 and features similar to workstation 110. Workstation 410 has access points 414 that allow Bots to enter and exit from the same end similar to workstation 110 however a third access lane has been added to allow a second product Bot to enter and exit to service the order Bot. Adding the second product Bot allows one to be serviced by the picking robot while the other is replaced with a new product Bot for the next pick. Here, order tote may be located at position 422 where two parallel product tote locations 420, 424 are provided. Similarly, a second robot location may be provided where pick and place robots 430, 432 may be provided to service order tote 422 in parallel, for example where robots 430, 432 sequentially place eaches in tote 422 but each being dedicated to their respective product tote, for example, robot 432 dedicated to tote 420 and robot 430 dedicated to tote 424.

Figure 6:
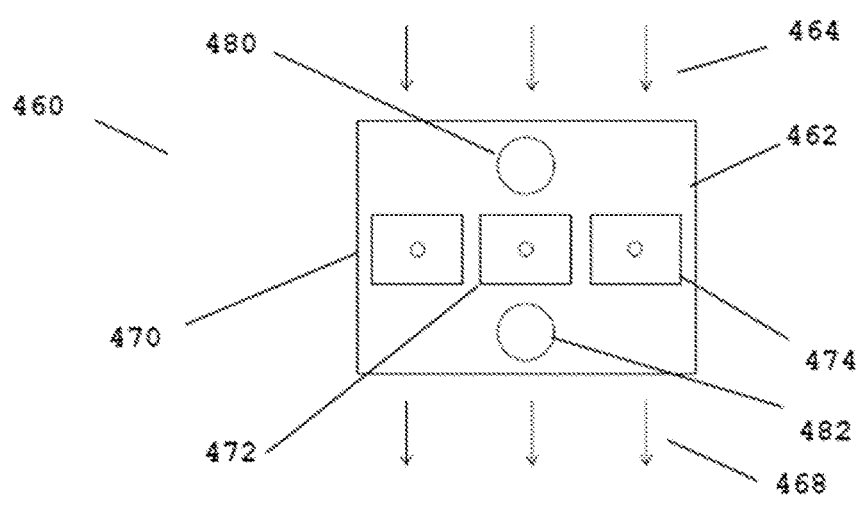
FIG. 6 is a schematic top view of a picking workstation according to embodiments of the present technology.

Referring now to FIG. 6, there is shown a schematic top view of a picking workstation 460 according to embodiments of the present technology. Workstation 460 may have workstation housing 462 and features similar to workstation 410. However, workstation 460 has access point 464 that allow Bots to enter and access point 468 that allow Bots to exit from other locations but with the third access lane to allow a second product Bot to enter and exit to service the order Bot. Here, order tote may be located at position 472 where two parallel product tote locations 470, 474 are provided. Similarly, a second robot location is provided where pick and place robots 480, 482 may be provided to service order tote 472 in parallel, for example where robots 480, 482 sequentially place eaches in tote 472 but each being dedicated to their respective product tote, for example, robot 482 dedicated to tote 470 and robot 480 dedicated to tote 474.

The foregoing description has been presented for purposes of illustration and description. It is not intended to be exhaustive or to limit the description to the precise form disclosed. Many modifications and variations are possible in light of the above teaching. The described embodiments were chosen in order to best explain the principles of the claimed system and its practical application to thereby enable others skilled in the art to best utilize the claimed system in various embodiments and with various modifications as are suited to the particular use contemplated.

What is claimed:

1. A workstation for an automated goods-to-person system, comprising:
   a housing comprising first and second sections, the first section comprising:
      a first entry port configured to allow a first group of one or more mobile robots to enter the workstation, the first group of mobile robots comprising product totes carrying goods to fulfill an order,
      a first access port configured to present the product totes for transfer of goods from the product totes, and a first exit port configured to allow the first group of mobile robots to exit the workstation;

and the second section comprising:
a second entry port configured to allow a second group of one or more mobile robots to enter the workstation, the second group of mobile robots comprising order totes for receiving goods from the product totes to fulfill an order,
a second access port configured to present the order totes for receiving goods from the product totes, and
a second exit port configured to allow the second group of mobile robots to exit the workstation; and a robot configured to access goods from the product totes through the first access port and transfer the goods to the order totes through the second access port;

wherein the housing is configured to accept the first and second groups of mobile robots through the first and second entry ports at a first level, cycle the first and second groups of mobile robots into the housing and up to a second level above the first level to present the first and second groups of mobile robots to the first and second access ports, and then cycle the first and second groups of mobile robots out of the housing through the first and second exit ports.

2. The workstation of claim 1, further comprising a material control system configured to coordinate transfer of select product totes to the workstation together with select order totes.

3. The workstation of claim 2, further comprising one or more cameras configured to capture images of the product totes to enable the material control system to determine locations of goods to be picked from the product totes.

4. The workstation of claim 3, further comprising one or more cameras configured to capture images of the order totes to enable the material control system to determine locations of where goods are to be placed into the order totes.

5. The workstation of claim 4, wherein the one or more cameras configured to capture images of the product totes are the same cameras as the one or more cameras configured to capture images of the order totes.

6. The workstation of claim 4, wherein the one or more cameras configured to capture images of the product totes are different than the one or more cameras configured to capture images of the order totes.

7. The workstation of claim 1, further comprising a third section, the third section comprising:
a third entry port configured to allow a third group of one or more mobile robots to enter the workstation, the third group of mobile robots comprising a second group of product totes carrying goods to fulfill an order,
a third access port configured to present the second group of product totes for transfer of goods from the second group of product totes, and
a third exit port configured to allow the third group of mobile robots to exit the workstation.

8. The workstation of claim 7, wherein the second section is positioned between the first and third sections.

9. The workstation of claim 7, further comprising a second robot configured to access goods from the second group of product totes through the third access port and transfer the goods to the order totes through the second access port.

10. The workstation of claim 9, further comprising a material control system configured to coordinate transfer of goods from the product totes and second group of product totes to the order totes by the first and second robots.

11. The workstation of claim 10, the material control system further coordinating travel of the first group of one or more mobile robots to the workstation while the third group of one or more mobile robots are positioned at the third access port, and the material control system coordinating travel of the third group of one or more mobile robots to the workstation while the first group of one or more mobile robots are positioned at the first access port.

12. The workstation of claim 1, further comprising a human picking platform configured to support a human operator for manual transfer of goods from the product totes positioned at the first access port to the order totes positioned at the second access port.

13. A workstation for an automated goods-to-person system, comprising:
a housing comprising first and second sections, the first section comprising:
a first entry port configured to allow a first group of one or more mobile robots to enter the workstation, the first group of mobile robots comprising product totes carrying goods to fulfill an order,
a first access port configured to present the product totes for transfer of goods from the product totes, and
a first exit port configured to allow the first group of mobile robots to exit the workstation;
and the second section comprising:
a second entry port configured to allow a second group of one or more mobile robots to enter the workstation, the second group of mobile robots comprising order totes for receiving goods from the product totes to fulfill an order,
a second access port configured to present the order totes for receiving goods from the product totes, and
a second exit port configured to allow the second group of mobile robots to exit the workstation; and
a robot configured to access goods from the product totes through the first access port and transfer the goods to the order totes through the second access port;
wherein the housing is configured to accept the first and second groups of mobile robots through the first and second entry ports at a first side of the housing, cycle the first and second groups of mobile robots into the housing to the first and second access ports, and then cycle the first and second groups of mobile robots out of the housing through the first and second exit ports positioned at a second side of the housing opposed to the first side of the housing.

14. The workstation of claim 13, further comprising a material control system configured to coordinate transfer of select product totes to the workstation together with select order totes.

15. The workstation of claim 14, further comprising one or more cameras configured to capture images of the product totes and order totes within the workstation to enable the material control system to determine locations of goods to be picked from the product totes and placed in the order totes.

16. The workstation of claim 13, further comprising a third section, the second section positioned between the first and third sections, the third section comprising:
a third entry port configured to allow a third group of one or more mobile robots to enter the workstation, the third group of mobile robots comprising a second group of product totes carrying goods to fulfill an order,
a third access port configured to present the second group of product totes for transfer of goods from the second group of product totes, and a third exit port configured to allow the third group of mobile robots to exit the workstation.

17. The workstation of claim 16, further comprising a second robot configured to access goods from the second group of product totes through the third access port and transfer the goods to the order totes through the second access port.

18. A workstation for an automated goods-to-person system, comprising:
- a housing comprising first, second and third sections, the second section positioned between the first and third sections, the first section comprising:
  - a first entry port configured to allow a first group of one or more mobile robots to enter the workstation, the first group of mobile robots comprising a first group of product totes carrying goods to fulfill an order,
  - a first access port configured to present the first group of product totes for transfer of goods from the first group of product totes, and
  - a first exit port configured to allow the first group of mobile robots to exit the workstation;
- the second section comprising:
  - a second entry port configured to allow a second group of one or more mobile robots to enter the workstation, the second group of mobile robots comprising order totes for receiving goods from the product totes to fulfill an order,
  - a second access port configured to present the order totes for receiving goods from the product totes, and
  - a second exit port configured to allow the second group of mobile robots to exit the workstation, and
- the third section comprising:
  - a third entry port configured to allow a third group of one or more mobile robots to enter the workstation, the third group of mobile robots comprising a second group of product totes carrying goods to fulfill an order,
  - a third access port configured to present the second group of product totes for transfer of goods from the second group of product totes, and
  - a third exit port configured to allow the third group of mobile robots to exit the workstation; and
- a robot configured to access goods from the product totes through the first access port and transfer the goods to the order totes through the second access port.

19. The workstation of claim 18, further comprising a material control system configured to coordinate travel of the first group of one or more mobile robots to the workstation while the third group of one or more mobile robots are positioned at the third access port, and the material control system configured to coordinate travel of the third group of one or more mobile robots to the workstation while the first group of one or more mobile robots are positioned at the first access port.

20. The workstation of claim 19, further comprising one or more cameras configured to capture images of the product totes and order totes within the workstation to enable the material control system to determine locations of goods to be picked from the product totes and placed in the order totes.

* * * * *